(12) United States Patent
Schinski

(10) Patent No.: US 8,641,991 B2
(45) Date of Patent: Feb. 4, 2014

(54) HYBRID REFINERY FOR CO-PROCESSING BIOMASS WITH CONVENTIONAL REFINERY STREAMS

(75) Inventor: William L. Schinski, San Rafael, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 609 days.

(21) Appl. No.: 11/847,793

(22) Filed: Aug. 30, 2007

(65) Prior Publication Data

US 2009/0060803 A1  Mar. 5, 2009

(51) Int. Cl.
- *B01J 8/00* (2006.01)
- *B01J 7/00* (2006.01)
- *C07C 1/00* (2006.01)
- *C07C 27/00* (2006.01)

(52) U.S. Cl.
USPC .......... 422/600; 48/61; 48/73; 48/89; 48/101; 48/111; 48/127.7; 48/199 FM; 48/202; 48/210; 585/241; 585/640; 518/700; 518/702; 518/703; 518/704

(58) Field of Classification Search
USPC ......... 422/189, 198, 188, 150, 190, 192, 600; 48/61, 73, 89, 101, 111, 127.7, 199 FM, 48/202, 210; 585/640, 241; 518/700, 702, 518/703, 704
See application file for complete search history.

(56) References Cited

U.S. PATENT DOCUMENTS

| | | | |
|---|---|---|---|
| 4,239,925 A | 12/1980 | Pretzer et al. | |
| 4,439,209 A | 3/1984 | Wilwerding et al. | |
| 4,497,637 A * | 2/1985 | Purdy et al. | 48/111 |
| 5,134,944 A | 8/1992 | Keller et al. | |
| 5,328,883 A | 7/1994 | Washecheck et al. | |
| 5,504,259 A | 4/1996 | Diebold et al. | |
| 5,821,111 A | 10/1998 | Grady et al. | |
| 5,840,178 A * | 11/1998 | Huang et al. | 208/251 R |
| 5,922,090 A * | 7/1999 | Fujimura et al. | 48/197 R |
| 6,455,011 B1 * | 9/2002 | Fujimura et al. | 422/139 |
| 6,676,716 B2 * | 1/2004 | Fujimura et al. | 48/197 FM |
| 7,196,239 B2 * | 3/2007 | Van Egmond et al. | 585/640 |
| 7,220,502 B2 | 5/2007 | Galloway | |
| 2002/0095866 A1 * | 7/2002 | Hassett | 48/199 FM |
| 2002/0120017 A1 * | 8/2002 | Bohn et al. | 518/703 |

(Continued)

FOREIGN PATENT DOCUMENTS

WO  WO 2005021686 A1 *  3/2005  ................ C10J 3/00
WO  WO 2005078159        8/2005

OTHER PUBLICATIONS

Salge et al., "Renewable Hydrogen from Nonvolatile Fuels by Reactive Flash Volatilization," Science, vol. 314, pp. 801-804, 2006.
Keil, "Methanol-to-Hydrocarbons: Process Technology," Microporous and Mesoporous Materials, vol. 29, pp. 49-66, 1999.
Dry, "Fischer-Tropsch Synthesis Over Iron Catalysts," Catalysis Letters, vol. 7, pp. 241-252, 1990.

(Continued)

*Primary Examiner* — Walter D Griffin
*Assistant Examiner* — Huy-Tram Nguyen
(74) *Attorney, Agent, or Firm* — Carlos Hanze; Tiffany E. Weksberg

(57) ABSTRACT

The present invention is generally directed to methods and systems for processing biomass into usable products, wherein such methods and systems involve an integration into conventional refineries and/or conventional refinery processes. Such methods and systems provide for an enhanced ability to utilize biofuels efficiently, and they can, at least in some embodiments, be used in hybrid refineries alongside conventional refinery processes.

21 Claims, 8 Drawing Sheets

(56) References Cited

U.S. PATENT DOCUMENTS

| | | | |
|---|---|---|---|
| 2004/0192951 A1 | 9/2004 | Appel et al. | |
| 2005/0095183 A1 | 5/2005 | Rehmat et al. | |
| 2005/0247553 A1* | 11/2005 | Ichikawa et al. | 202/96 |
| 2005/0256212 A1* | 11/2005 | Norbeck et al. | 518/702 |
| 2006/0112639 A1 | 6/2006 | Nick et al. | |
| 2006/0194990 A1* | 8/2006 | Miyoshi et al. | 585/241 |
| 2007/0099038 A1* | 5/2007 | Galloway | 429/17 |
| 2007/0100003 A1* | 5/2007 | Holley et al. | 518/702 |
| 2007/0217995 A1 | 9/2007 | Matsumura et al. | |
| 2007/0227069 A1* | 10/2007 | Norbeck et al. | 48/89 |
| 2007/0256361 A1 | 11/2007 | Kindig | |
| 2008/0006520 A1 | 1/2008 | Badger et al. | |

OTHER PUBLICATIONS

Non-Final Rejection dated Dec. 4, 2012 regarding U.S. Appl. No. 11/847,714, filed Aug. 30, 2007.
Advisory Action dated Aug. 29, 2012 regarding U.S. Appl. No. 11/847,714, filed Aug. 30, 2007.
Final Office Action dated Jun. 18, 2012 regarding U.S. Appl. No. 11/847,714, filed Aug. 30, 2007.
Non-Final Office Action dated Nov. 4, 2011 regarding U.S. Appl. No. 11/847,714, filed Aug. 30, 2007.
Final Office Action dated May 12, 2010 regarding U.S. Appl. No. 11/847,714, filed Aug. 30, 2007.
Non-Final Office Action dated Oct. 1, 2009 regarding U.S. Appl. No. 11/847,714, filed Aug. 30, 2007.

* cited by examiner

US 8,641,991 B2

HYBRID REFINERY FOR CO-PROCESSING BIOMASS WITH CONVENTIONAL REFINERY STREAMS

FIELD OF THE INVENTION

This invention relates generally to methods and systems for processing biomass into usable products, and specifically to methods and systems for integrating such processing with conventional refineries, as well as to the hybrid refineries resulting therefrom.

BACKGROUND

Many methods have been suggested for utilizing biofuel for energy production in order to compensate for at least a portion of the fossil fuel currently used in such energy production, and thereby also decrease net $CO_2$ emissions in the overall energy production cycle.

Unfortunately, biofeedstocks are generally considered to be low energy fuels, and not easily utilized for energy production. The low energy content of biomass renders it generally inadequate for high-efficiency production of energy, such as high-temperature, high-pressure steam or electricity. Additionally, non-uniformity in the raw material (i.e., biomass), differences in its quality, and other similar hard-to-control variations, may cause problems in an energy production cycle that relies heavily on such fuel.

In view of the foregoing, methods and/or systems for integrating biofuel synthesis with traditional refinery processes would be extremely useful—particularly wherein they serve to alleviate issues relating to biofuel raw materials (including their non-uniformity and variable production cycle).

BRIEF DESCRIPTION OF THE INVENTION

The present invention is generally directed to methods and systems for processing biomass into usable products, wherein such methods and systems involve an integration into conventional refineries and/or conventional refinery processes. In some embodiments, the present invention is directed to the hybrid refineries resulting from such an integration.

In some embodiments, the present invention is directed to a method or process for introducing biomass into a conventional refinery, the process comprising the steps of: (1) co-feeding biomass and refinery residual material as a hybrid feedstock to a gasifier; (2) gasifying the hybrid feedstock in the gasifier to form syngas; and (3) processing the syngas to form a syngas-derived product, wherein at least some of the syngas-derived product (e.g., hydrocarbons, $H_2$, steam, power, etc.) is utilized in the conventional refinery.

In some or other embodiments, the present invention is directed to a system or hybrid refinery comprising: a conventional refinery operable for refining petroleum and a subsystem for converting biomass into a feed for the conventional refinery, wherein the subsystem comprises: (i) a means for co-feeding biomass and refinery residual material as a hybrid feedstock to a gasifier; (ii) a means for gasifying the hybrid feedstock within the gasifier to form syngas; and (iii) a means for processing the syngas to form a syngas-derived product, wherein at least some of the syngas derived product is utilized in the conventional refinery; and further wherein said subsystem is integrated with one or more aspects of the conventional refinery.

The foregoing has outlined rather broadly the features of the present invention in order that the detailed description of the invention that follows may be better understood. Additional features and advantages of the in invention will be described hereinafter which form the subject of the claims of the invention.

BRIEF DESCRIPTION OF THE DRAWINGS

For a more complete understanding of the present invention, and the advantages thereof; reference is now made to the following descriptions taken, in conjunction with the accompanying drawings, in which.

DETAILED DESCRIPTION OF THE INVENTION

Figure 1:
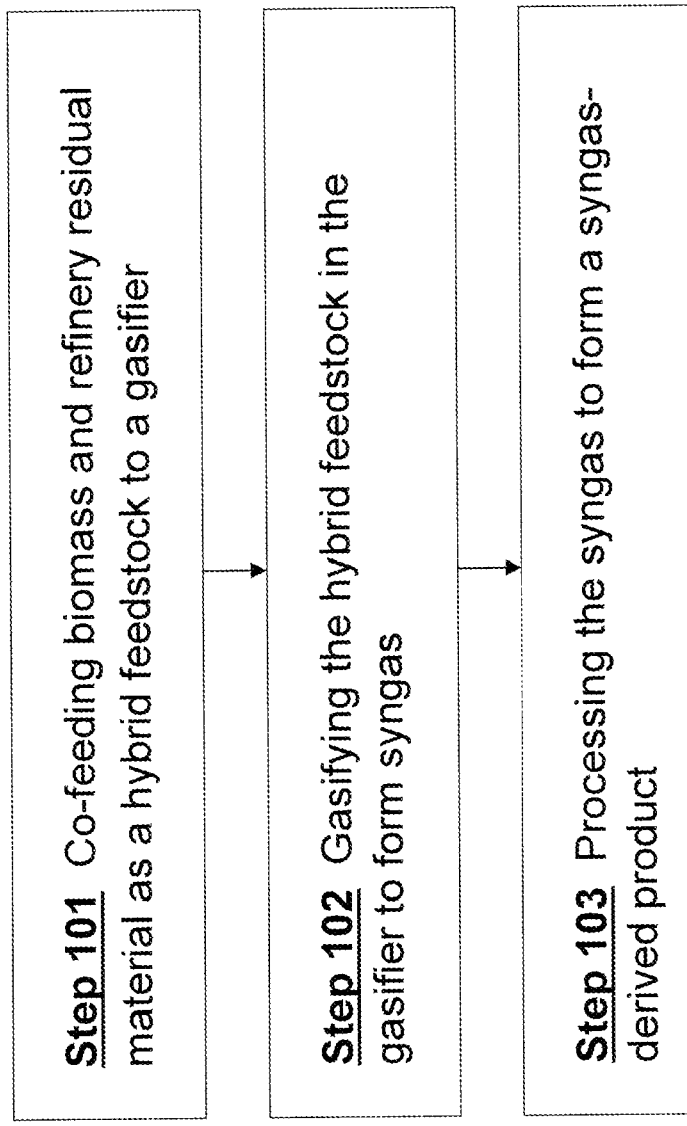
FIG. 1 depicts, in flow diagram form, a process for introducing/integrating biomass into a conventional refinery, in accordance with some embodiments of the present invention.

As mentioned above, the present invention is generally directed to methods and systems for processing biomass into usable products and/or energy, wherein such methods and systems involve an integration into conventional refineries and/or conventional refinery processes. In some embodiments, the present invention is directed to the hybrid refineries resulting from such an integration. In some embodiments, the methods and systems of the present invention act to mitigate some of the issues (described above) associated with the processing of biomass (the raw materials) into biofuels and/or associated products.

1. Definitions

Certain terms are defined throughout this description as they are first used while certain other terms used in this description are defined below:

"Biofuel," as defined herein, is a fuel product at least partly derived from "biomass," the latter being a renewable resource of biological origin. For the purposes of this invention, this term is further broadened to include "municipal solid waste" ("MSW")—regardless of whether or not the MSW is of direct biological origin.

A "conventional refinery," as defined herein generally refers to an oil refinery, or aspects thereof where crude oil (or other fossil fuels such as coal or natural gas) is processed. Processes carried out at such refineries include, but are not limited to, reforming, cracking, distilling, and the like.

"Refinery residual," or "refinery resid," as defined herein, generally refers to the heaviest by-product fractions produced at a refinery. Asphaltenes are a type of refinery resid, as is coker coke.

A "feedstock," within the context of a refinery, and as used herein, refers to hydrocarbonaceous material fed into one or more refinery processes in order to make a fuel or other commercial product.

A "gasifier," as defined herein, refers to a reaction environment wherein condensed hydrocarbonaceous feedstock material is converted into a gas through the action of heat and, possibly, one or more reactive gases such as oxygen, air, carbon dioxide ($CO_2$), and/or steam.

"Synthesis gas," or "syngas," as defined herein, generally refers to a mixture of carbon monoxide (CO) and hydrogen ($H_2$) produced by gasification in a gasifier.

Steam reforming of coal yields syngas according to the following equation:

$$C+H_2O \rightarrow H_2+CO$$

Steam reforming of natural gas yields syngas according to the following reaction:

$$CH_4+H_2O \rightarrow CO+3H_2$$

General oxidative routes from hydrocarbons to syngas are as follows:

$$C_nH_{(2n+2)}+(n/2)O_2 \rightarrow nCO+(n+1)H_2$$

As mentioned above, syngas can be catalytically-converted to paraffins (alkanes) via a catalytic Fischer-Tropsch (FT) process:

$$nCO+(2n+1)H_2 \rightarrow C_nH_{(2n+2)}+nH_2O$$

where typical catalysts include iron and cobalt. Examples of the Fisher-Tropsch process are described in U.S. Pat. No. 6,846,402.

In addition to the reactions shown above, it is worth noting that CO from syngas can undergo a "water-gas shift (WGS)" reaction to produce $CO_2$ and $H_2$:

$$CO+H_2O \rightarrow CO_2+H_2$$

"Pyrolyzing," as defined herein, refers to a thermal processing and/or thermal decomposition of hydrocarbonaceous material, wherein said decomposition is typically carried out in a non-oxidative environment.

"Pyrolysis oil," as defined herein, refers to a liquid hydrocarbon product resulting from the pyrolyzing treatment of hydrocarbonaceous material.

A "hybrid refinery," as defined herein, refers to a conventional refinery (or aspects thereof) that has been at least partially integrated (or otherwise associated) with a subsystem for the processing of a biomass feedstock.

"Syncrude" or "synthesis crude," as defined herein, refers to a hydrocarbon-based oil made from syngas using a Fischer-Tropsch or Isosynthesis process or variants thereof.

2. Methods

Referring to FIG. 1, in some embodiments, the present invention is directed to a method or process for introducing biomass into a conventional refinery, the process comprising the steps of: (Step 101) co-feeding biomass and refinery residual material as a hybrid feedstock to a gasifier; (Step 102) gasifying the hybrid feedstock in the gasifier to form syngas; and (Step 103) processing the syngas to form a syngas-derived product, wherein at least some of the syngas-derived product is utilized in the conventional refinery. The syngas-derived product may comprise a variety of constituents including, but not limited to, hydrocarbons, $H_2$, water (steam), power, and the like.

In some such above-mentioned method embodiments, such feedstocks for conventional refinery processes include, but are not limited to, fossil feedstocks, crude oil, tar sands, shale oil, coal, natural gas, combinations thereof, and the like. In some embodiments, the refinery residual material comprises asphaltenes and/or tars or other low-value carbonaceous by-product streams.

In some such above-mentioned method embodiments, such biomass can include, but not be limited to, agricultural feedstocks, forestry-based feedstocks, municipal solid waste, combinations thereof, and the like. In some such embodiments, wherein the biomass comprises municipal solid waste (MSW), the municipal solid waste can include, but not be limited to, waste plastics, used tires, paper, scrap-wood, food-processing waste, sewage, sludge, green-waste, combinations thereof, and the like.

In some such above-mentioned method embodiments, the method/process further comprises a step of pyrolyzing at least some of the biomass to form pyrolysis oil (py-oil), wherein the pyrolysis oil is co-fed to the gasifier with the refinery residual material. Typically, the step of pyrolyzing is carried out in a non-oxidative environment. In some such embodiments, the hybrid feedstock fed to the gasifier generally comprises from at least about 1 weight percent pyrolysis oil to at most about 99 percent pyrolysis oil, and more typically from at least about 5 weight percent pyrolysis oil to at most about 90 percent pyrolysis oil.

In some such above-mentioned method embodiments, the biomass typically comprises at least about 5 weight percent water, more typically at least about 10 weight percent water, and most typically between 20 and 30 weight percent water.

As mentioned above, the biomass can contain a significant amount of water. Note that in some embodiments, a synergy between the biomass and the residual material and/or coke is exploited. In such embodiments, water from the biomass displaces steam (fully or in part) that is normally required for coal, coke or residual material gasification to form the $H_2$, component of syngas.

In some such above-mentioned method embodiments, the step of gasifying comprises a gasifier of a type selected from the group consisting of partial oxidation gasifier, a steam reformer, an autothermal reformer, and combinations thereof (although other gasifier types can also be used). In some such embodiments, the gasifier utilizes oxygen separated from air using a technique selected from the group consisting of cryogenic separation (cryo-$O_2$), pressure-swing absorption, membrane separation (e.g., ion-transport membrane, ITM), and combinations thereof. In some such embodiments, when the gasifier is a partial oxidation gasifier, the partial oxidation gasifier is a short-contact time catalytic reformer. In some cases, the partial oxidation gasifier utilizes an oxidizing gas selected from the group Consisting of air, oxygen-enriched air, pure oxygen, and combinations thereof.

In some such above-mentioned method embodiments, the syngas-derived product is selected from the group consisting of $H_2$, syncrude, hydrocarbons, oxygenates (e.g., alcohols and ethers), olefins, and combinations thereof. In some such embodiments, wherein the syngas-derived product comprises $H_2$, at least some of the $H_2$ is used in hydroprocessing operations within the (conventional) refinery. In some or other embodiments, steam and/or power produced directly or indirectly from the syngas can be at least partially directed into the conventional refinery.

In some such embodiments, where the syngas-derived product is or comprises syncrude, the syncrude is used analogously as crude. In some such embodiments, wherein the syngas-derived product comprises oxygenates, at least some of the oxygenates are converted to olefins and oligomerized. Note that F-T processes can also make olefins directly, and that these can be oligomerized too.

In some such above-mentioned method embodiments, there further comprises a step of conditioning the syngas prior to its processing, wherein such conditioning can comprise modulating the syngas by varying its $H_2:CO$ ratio and/or removing impurities and/or diluents. In such or other embodiments, such conditioning can comprise compression, as appropriate for biofuel synthesis.

3. Hybrid Refineries

Figure 2:
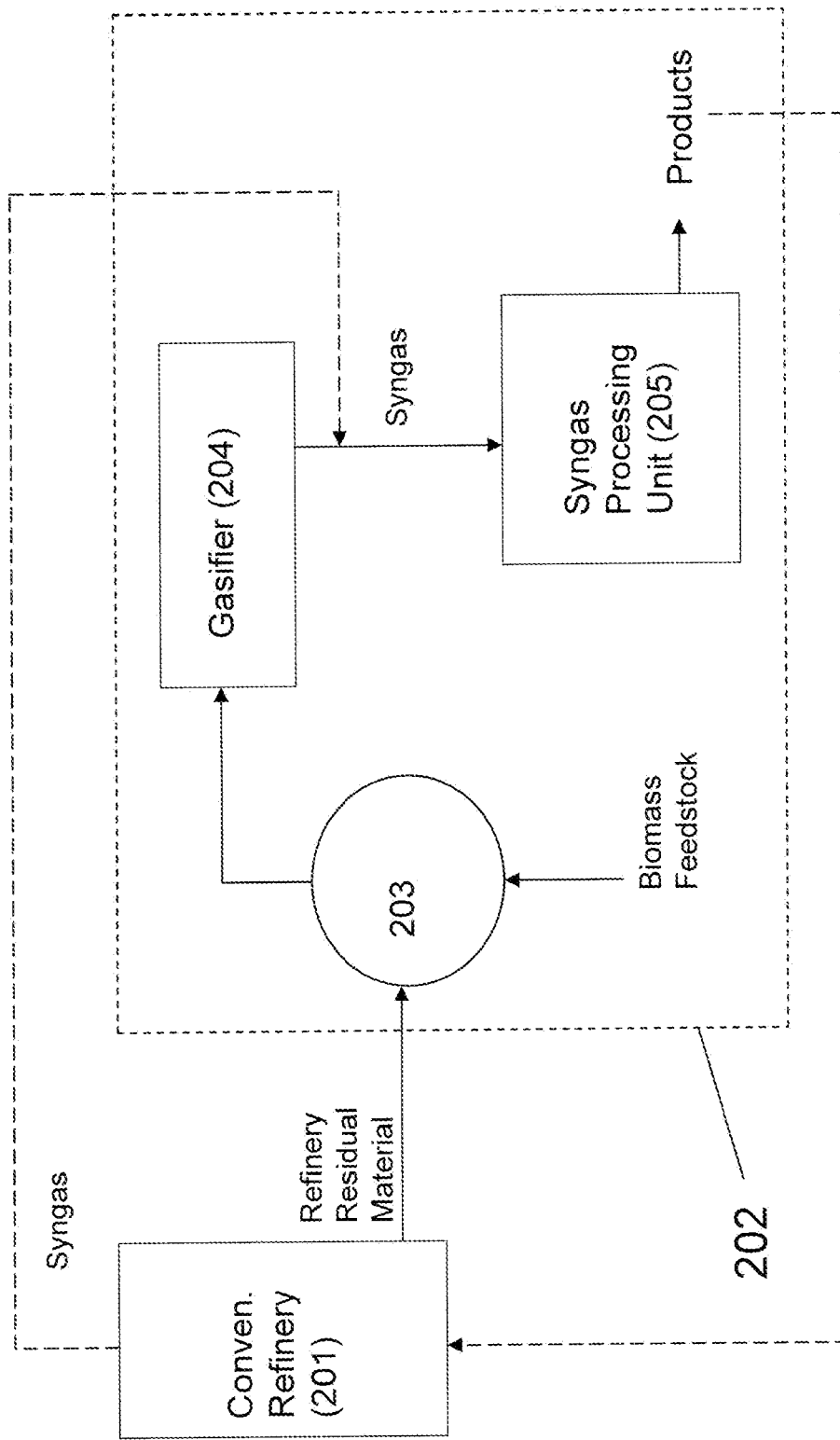
FIG. 2 is a schematic illustrating how a conventional refiery and a subsystem for processing biomass can be integrated as a hybrid refinery, in accordance with some embodiments of the present invention.

Referring to FIG. 2 in some embodiments, the present invention is directed to a system or hybrid refinery comprising: a conventional refinery (201) operable for refining petroleum; and a subsystem (202) for converting biomass into a feed for the conventional refinery, wherein the subsystem itself comprises: a means 203 for co-feeding biomass and refinery residual material as a hybrid feedstock to a gasifier; a means 204 for gasifying the hybrid feedstock within the gasifier to form syngas; and a means 205 for processing the syngas to form a syngas-derived product, wherein at least some of the syngas-derived product is utilized, as the above-mentioned feed, in the conventional refinery; wherein said subsystem is integrated with one or more aspects of the conventional refinery. Typically, in such embodiments, the conventional refinery comprises elements used in the conventional processing of petroleum. Still referring to FIG. 2, optional interdependencies are indicated by the dotted arrows, where syngas from the conventional refinery can be mixed with syngas from gasifier 204, and where products can be channeled back into refinery 201 for further processing and/or other uses.

In some such above-mentioned hybrid refinery embodiments, the means for co-feeding comprises an assembly for merging streams of biomass and refinery residual. In some such embodiments, the streams are combined before entering the gasifier. In other such embodiments, the streams are combined in the (gasifier. In some embodiments, at least one of the biomass and refinery residual streams comprises a slurry. In some embodiments, the biomass stream comprises py-oil, the py-oil being derived from biomass. Conversion to py-oil facilitates gasification at pressures significantly higher than ambient. In some embodiments, the refinery resid stream comprises one or more of asphaltenes, coke, and tar.

As mentioned above, the means for gasifying the biomass and refinery residual streams comprises a gasifier. In some such hybrid refinery embodiments, the gasifier is selected from the group consisting of a partial oxidation (PO)X) gasifier, a steam reformer, an autothermal reformer, and combinations thereof. An exemplary POX gasifier is a short contact-time reformer.

In some such above-mentioned hybrid refinery embodiments, the means for processing the syngas comprises a method selected from the group consisting of water-gas shift, Fischer-Tropsch, isosynthesis, oxygenate-generating processes, and combinations thereof (other syngas processing routes can be additionally or alternatively employed). In some or other such embodiments, the syngas-derived product is selected from the croup consisting of $H_2$, syncrude, hydrocarbons, oxygenates (erg., alcohols and ethers). Note that steam and/or electrical power can be generated directly and/or indirectly from the syngas, and that some or all of such steam and/or power can be directed back into the conventional refinery for use in one or more processes or attributes associated therewith.

In some such above-mentioned hybrid refinery embodiments, at least some processes of the conventional refinery and the subsystem for converting biomass are interdependent. In some such embodiments, this interdependency fosters a supply-tolerant system. For example, feed streams can be modulated across the conventional refinery-subsystem boundary (physical and/or virtual) to accommodate increases or decreases of other feeds going to the conventional refinery.

4. Examples

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

Example 1

This Example serves to illustrate an exemplary hybrid refinery integration, wherein biomass (as pyrolysis oil) and refinery resid are co-fed into a gasifier, in accordance with some embodiments of the present invention.

Figure 3:
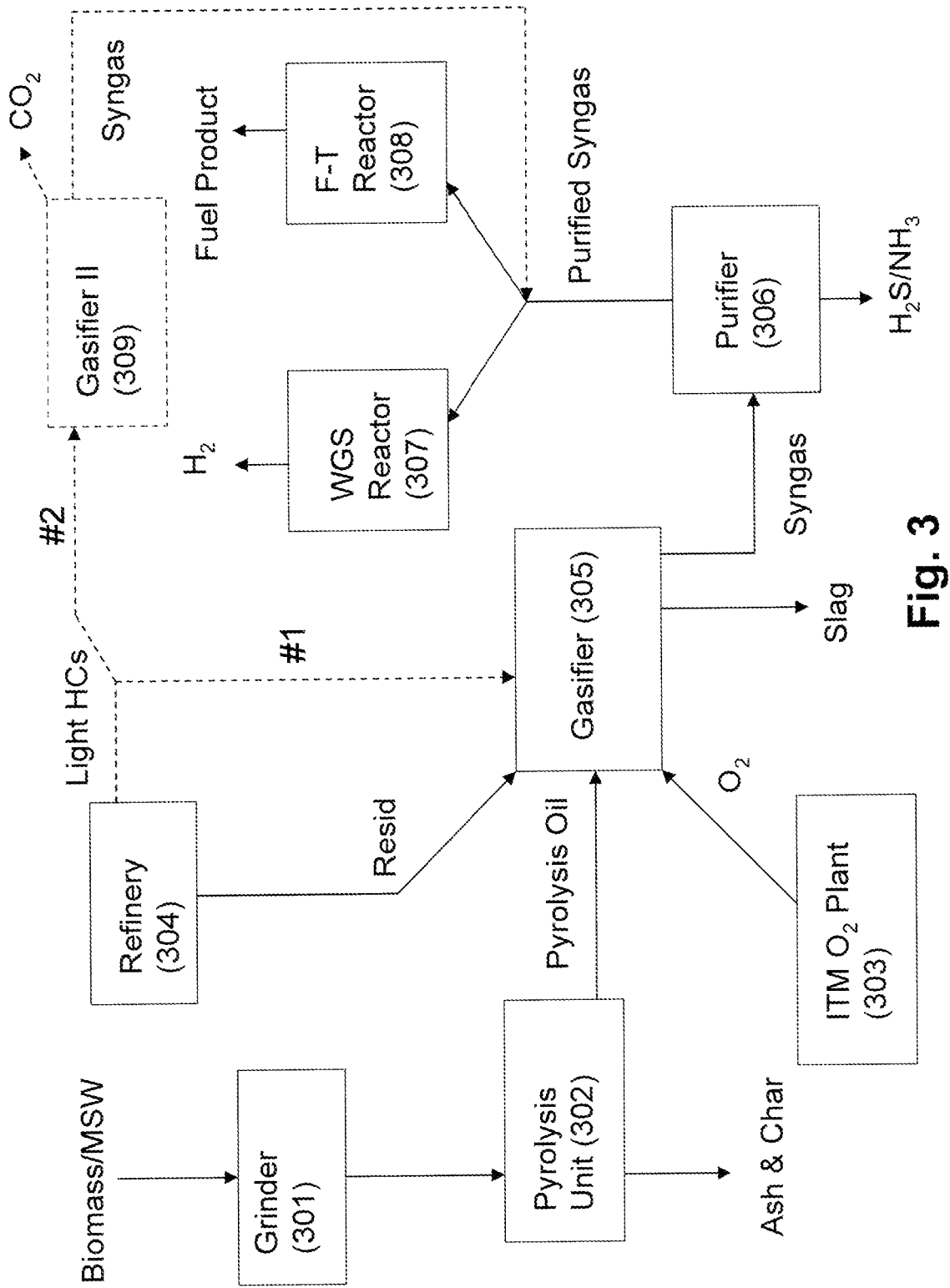
FIG. 3 is a schematic illustrating an exemplary hybrid refinery integration, wherein biomass (processed into pyrolysis oil) and refinery resid are co-fed into a gasifier, in accordance with some embodiments of the present invention.

Referring to FIG. 3, biomass and/or municipal solid waste (MSW) is processed first in a grinder 301 and then pyrolyzed in pyrolysis unit 302 to form pyrolysis oil py-oil). The py oil is co-fed into gasifier 305 with resid (and/or heavy crude) from refinery 304 and oxygen ($O_2$) from an air separation plant, such as an ion-transport membrane (ITM) $O_2$ plant, 303, and syngas is produced (note that a portion of the py-oil can be fed directly into the refinery for conventional processing). The syngas is purified by means known to those of skill in the art, and depicted as purification means 306, to remove any $H_2S$ and/or $NH_3$ present. Purified syngas is then passed into a water-gas shift (WGS) reactor 307 used to produce $H_2$ (which can be further utilized in other refinery processes), and/or it can be directed to a Fischer-Tropsch (F-T) reactor 308 where it is converted into a fuel intermediate or product. Optionally, light refinery hydrocarbons (HCs) can be co-fed into gasifier 305 (path #1), and/or they can be converted to syngas and purified in gasifier II 309 and subsequently introduced into WGS reactor 307 and/or F-T reactor 308—as indicated by the dotted line(s). Waste streams can include pyro-ash, gasifier slag, $CO_2$, and trace $H_2S$ and $NH_3$.

Example 2

This Example serves to illustrate an exemplary hybrid refinery integration, wherein biomass is fed into a short contact-time reformer, in accordance with some embodiments of the present invention.

Figure 4:
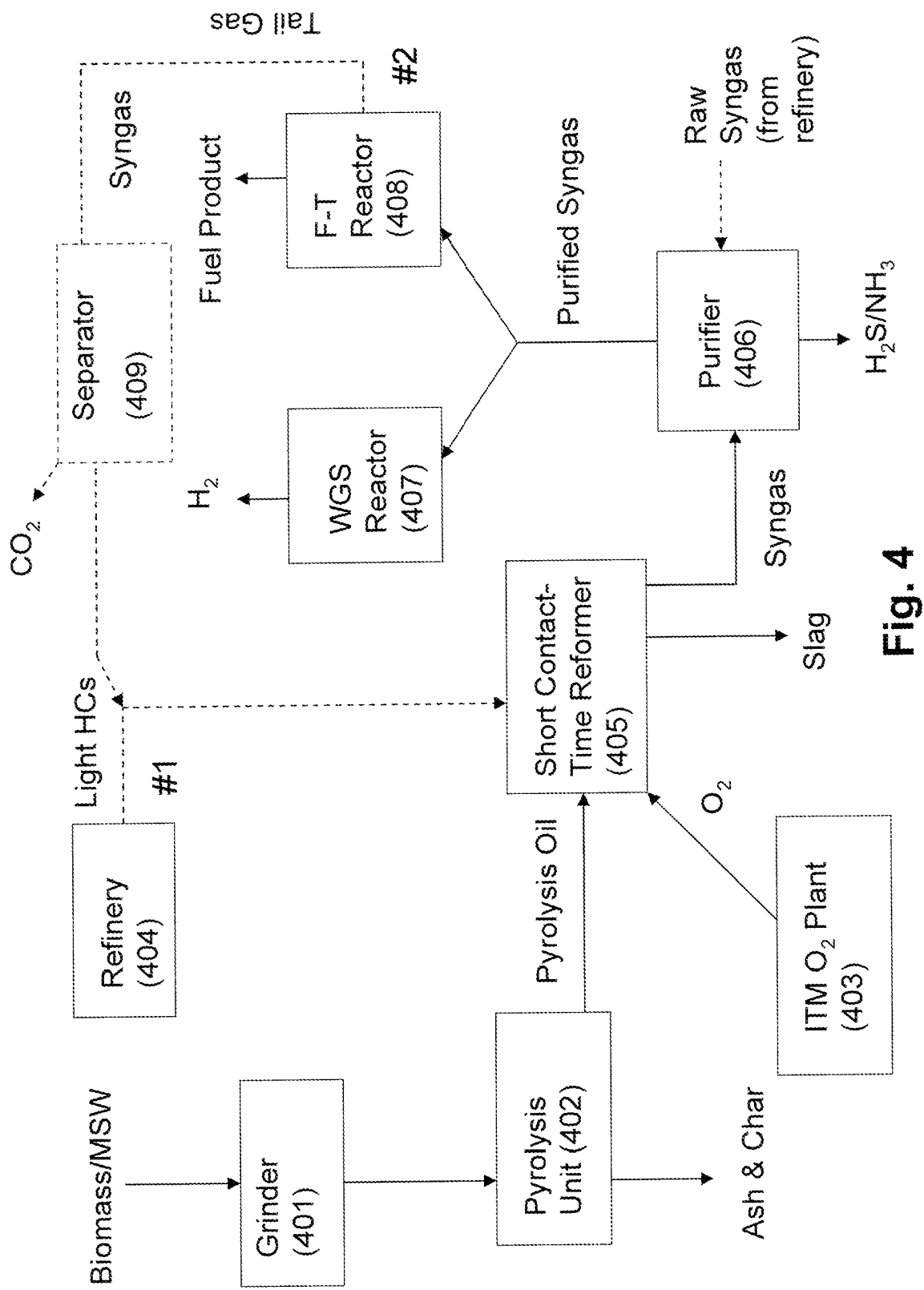
FIG. 4 is a schematic illustrating another exemplary hybrid refinery integration, wherein biomass is fed into a short contact-time reformer, in accordance with some embodiments of the present invention.

Referring to FIG. 4, biomass and/or MSW is processed in grinder 401 and then pyrolyzed in pyrolysis unit 402 to yield py-oil. The py-oil is then introduced into short contact-time reformer 405 with $O_2$, for example, from ion-transport membrane (ITM) oxygen plant 403. The syngas thus produced is purified of $H_2S$ and $NH_3$ in purifier 406. The purified syngas can then be directed to WGS reactor 407 to produce $H_2$ and/or it can be directed to F-T reactor 408 to produce a hydrocarbon product. Optionally, light HCs from refinery 404 can be co-fed into the short contact-time reformer 405 (path #1) and/or tail gas from F-T reactor 408 can be so co-fed with $CO_2$ removal via separator 409 (path #2). Hydrogen produced in WGS reactor 407 can further be used in other refinery processes. Waste streams can include pyro-ash, $CO_2$, and trace $H_2S$ and $NH_3$. See, e.g., Salge et al., "Renewable Hydrogen from Nonvolatile Fuels by Reactive Flash Volatilization," Science, vol. 314, pp. 801-804, 2006.

Figure 5:
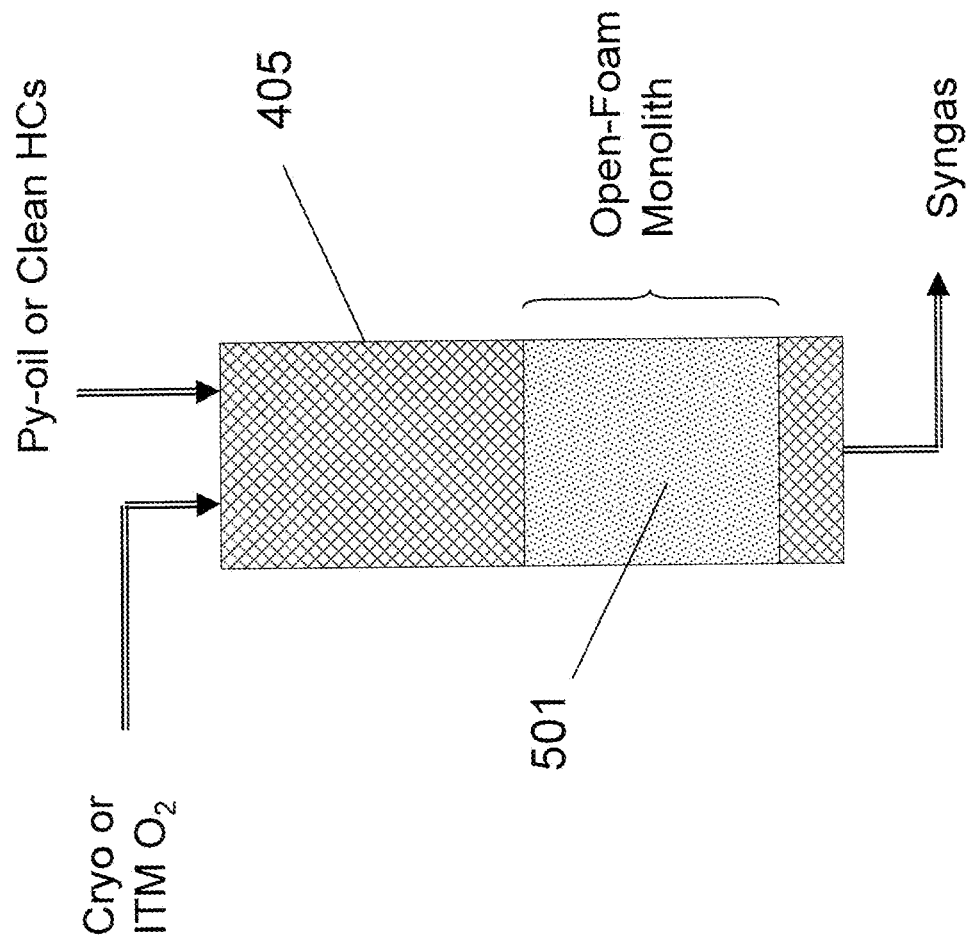
FIG. 5 illustrates a short contact-time reformer, as used in some hybrid refinery system embodiments of the present invention.

Short contact-time reformer 405 is further illustrated in FIG. 5, wherein cryogenic or ITM $O_2$ is introduced along with py-oil or clean (no sulfur) HCs into reformer 405 and these species are reacted in catalyst zone 501 to produce syngas. Note that the py-oil is expected to contain some low level of sulfur, and thus the catalyst in the short contact-time reformer must either accommodate the sulfur or the py-oil must be pre-treated. Note also that zone 501 is generally an open-foam monolith supporting catalyst species such as Pt metal. This type of reformer requires a lower capital expenditure (CAPEX) than a gasifier, but typically will not handle non-volatile inorganic species in the feed.

Example 3

This Example serves to illustrate an exemplary hybrid refinery integration, wherein biomass is fed into a short contact-time reformer to produce sagas that is combined with syngas produced by processing refinery resid in a flexi-coker whose regeneration section is fed oxygen, in accordance with some embodiments of the present invention.

Figure 6:
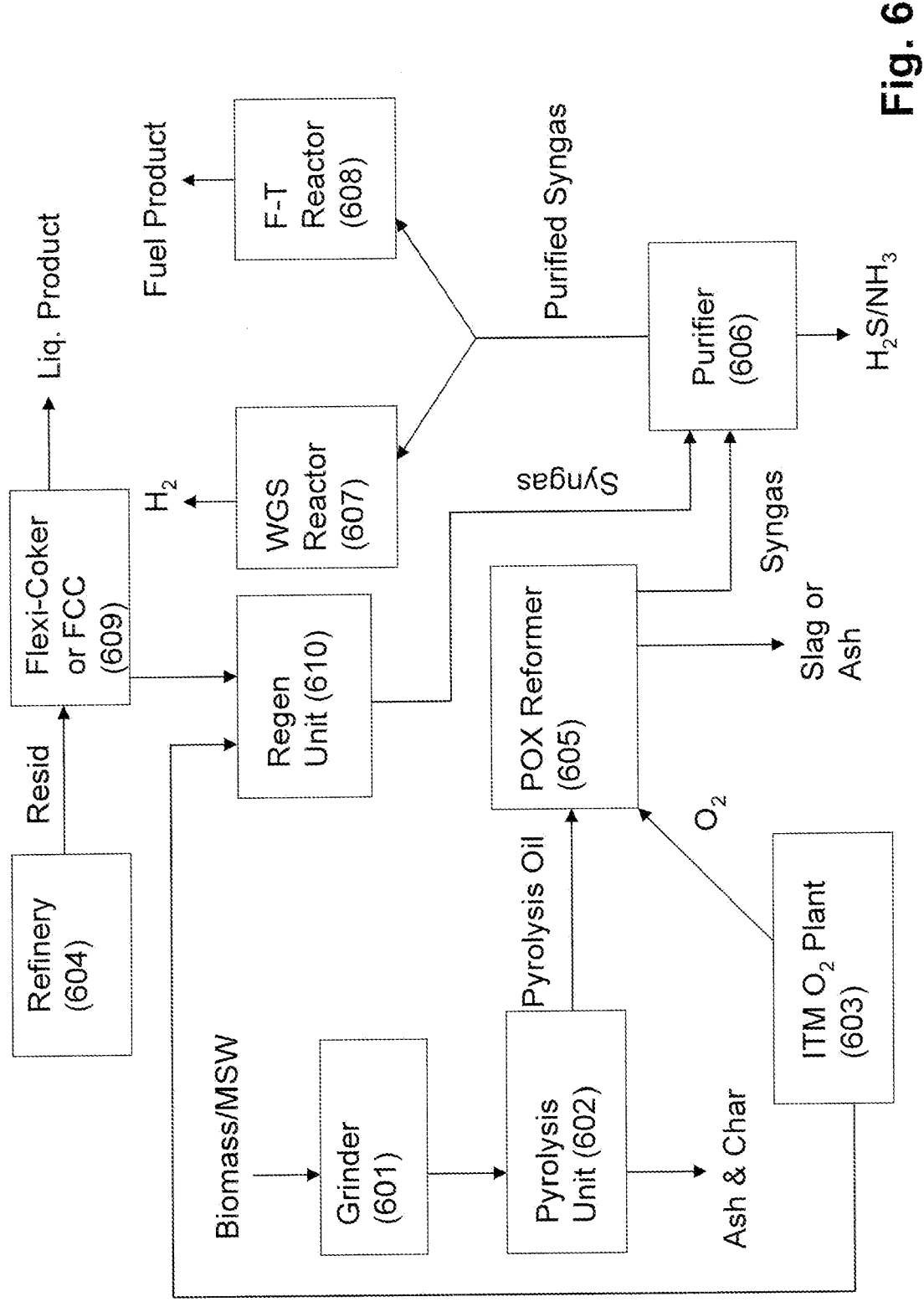
FIG. 6 is a schematic illustrating another exemplary hybrid refinery integration, wherein biomass is fed into a short contact-time catalytic reformer (or other POX reformer) to produce syngas that is combined with syngas produced by processing refinery resid in an oxygen-fed, Flexi-coker or FCC regenerator unit, in accordance with some embodiments of the present invention.

Referring to FIG. 6, biomass and/or MSW fed into grinder 601 and then into pyrolysis unit 602 where it is converted to py-oil. The py-oil is transferred into a short contact-time reformer 605 (other partial oxidation reformer types could alternatively be used), along with $O_2$ from ITM $O_2$ plant 603, where it is converted to syngas. Simultaneously or concurrently, resid from refinery 604 is processed in flexi-coker or fluid catalytic cracker (FCC) 609, the liquid product of which is transferred to regeneration unit 610, along with $O_2$ from ITM $O_2$ plant 603, to make syngas. See, e.g., Hammond et al., "Review of Fluid Coking and Flexicoking Technology," Amer. Inst. of Chem. Eng., 2003 Spring National Meeting, Apr. 2, 2003. The two separate syngas streams are then passed through purifier 606 to remove $H_2S$ and $NH_3$. The purified syngas that is produced is then passed into a water-gas shift (WGS) reactor 607 used to produce $H_2$ (which can be further utilized in other refinery processes), and/or it can be directed to a Fischer-Tropsch (F-T) reactor 608 where it is converted into a fuel product. Alternatively, all or part of the syngas may be used to generate power or steam. Waste streams can include pyro-ash, $CO_2$, and trace $H_2S$ and $NH_3$.

Example 4

This Example serves to illustrate high-pressure syngas conversion options, in accordance with some embodiments of the present invention.

Figure 7:
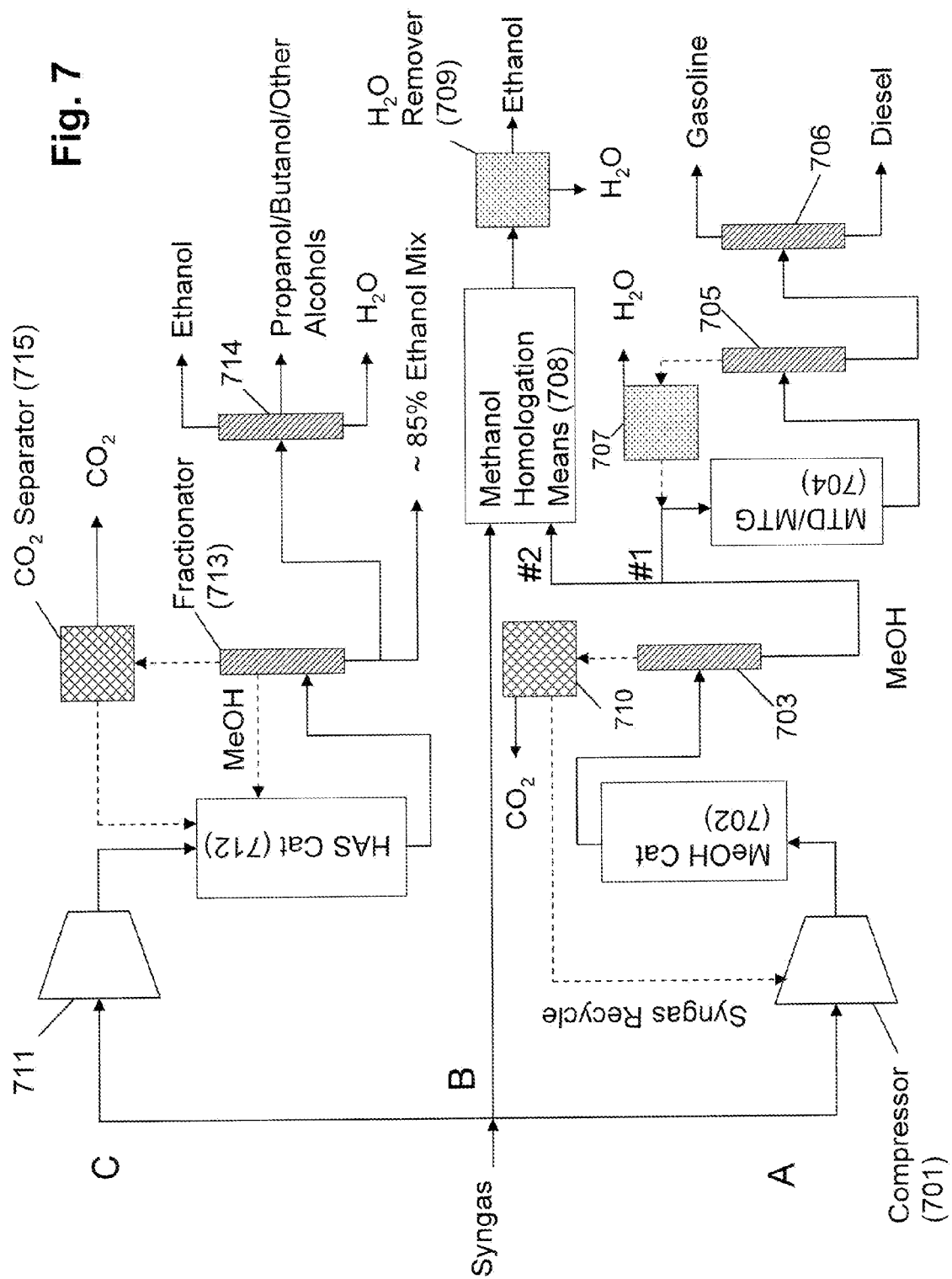
FIG. 7 is a schematic illustrating high-pressure syngas conversion options, in accordance with some embodiments of the present invention.

Referring now to FIG. 7, syngas produced according to one or more embodiments of the present invention can be further processed via any or all of streams A-C.

In stream A, syngas is pressurized by compressor 701 and then fed into methanol (MeOH) catalytic unit 702 to produce a methanol-containing product which is fed into fractionator 703. Methanol emanates from said fractionator and can follow one or both of two paths. In path #1, the methanol is fed into a combined methanol-to-diesel (MTD)/methanol-to-gasoline (MTG) unit 704. See, erg., Keil, "Methanol-to-Hydrocarbons: Process Technology," Microporous and Mesoporous Materials, vol. 29, pp. 4966, 1999. The product that results is then passed through fractionators 705 and 706, after which it can be collected separately as gasoline and diesel. The lighter fractions resulting from fractionator 705 can be passed through purifier 707 to remove water and then recycled back into unit 704 (largely as methanol). In path #2, methanol is additionally or alternatively passed into methanol homologation means 708 (see, e.g., U.S. Pat. No. 4,239,925), along with syngas from stream B. The ethanol-containing product is then processed through $H_2O$ remover 709 to yield ethanol.

In stream C, syngas is pressurized by compressor 711 and passed into higher alcohol synthesis (HAS) catalytic unit 712 where it is converted into mixed alcohols. The mixed alcohols can then be passed through fractionator 713 to yield a predominately (~85%) ethanol product mix. This can be further processed in fractionator 714 to separate out water and other alcohols and produce relatively pure ethanol. Optionally, methanol can be extracted from fractionator 713 and cycled back to HAS unit 712. Other species, e.g., unconverted syngas, extracted by fractionator 713 can be passed through separator 715 and cycled back into the HAS unit as well.

Example 5

This Example serves to illustrate medium-pressure syngas conversion options, in accordance with some embodiments of the present invention.

Figure 8:
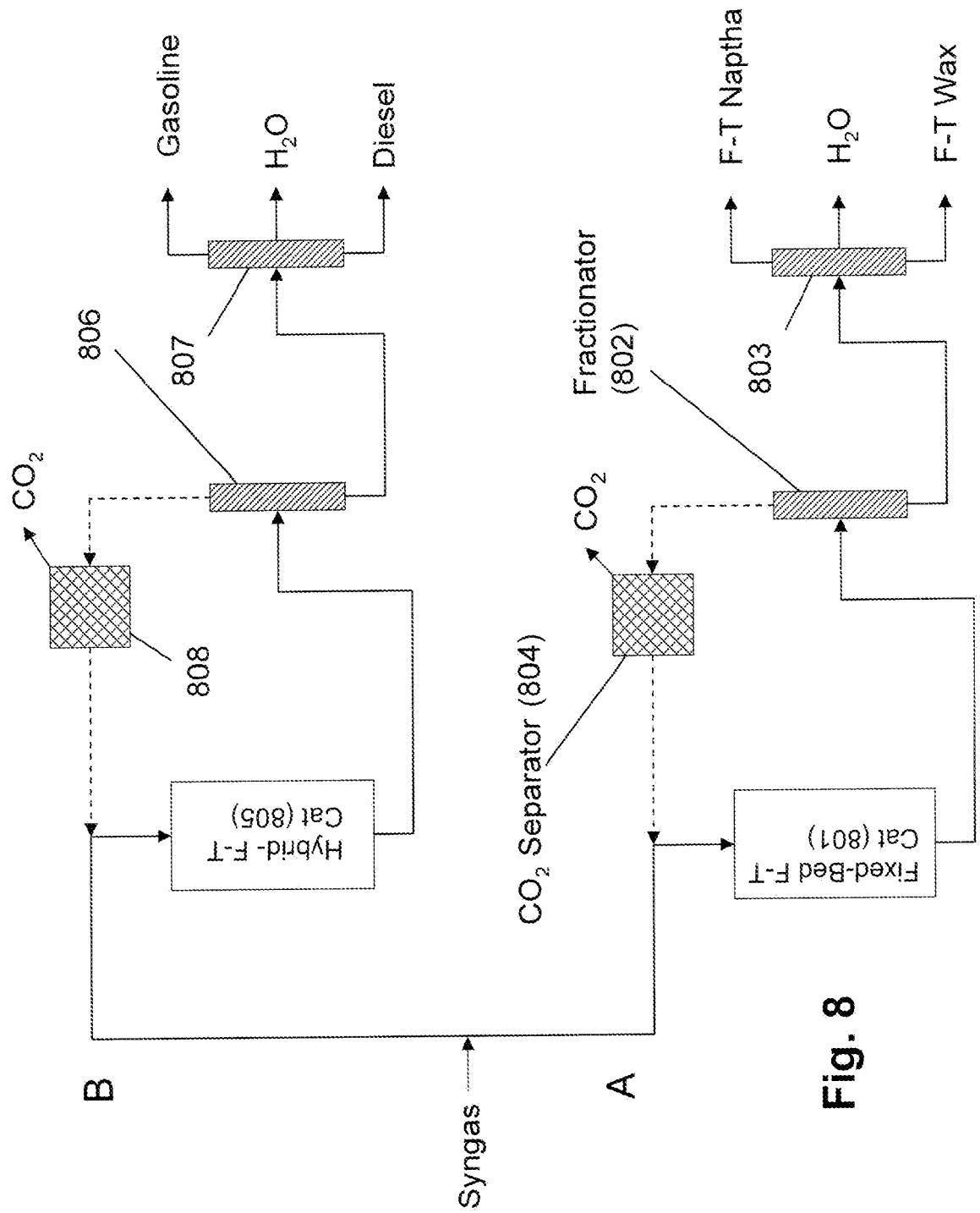
FIG. 8 is a schematic illustrating medium-pressure syngas conversion options, in accordance with some embodiments of the present invention.

Referring now to FIG. 8, syngas produced according to one or more embodiments of the present invention can be further processed via one or both of streams A and B.

In stream A, syngas is passed through a fixed-bed Fischer-Tropsch (F-T) catalytic reactor unit 801 to produce a hydrocarbon-containing product. See, e.g., Dry, "Fischer Tropsch Synthesis Over Iron Catalysts," Catalysis Letters, vol. 7, pp. 241-252, 1990. This hydrocarbon-containing product is then passed through fractionator 802 (as a hydrocarbon stream) to remove gaseous species. After passing through fractionator 802, the hydrocarbon stream is further fractionated into F-T naphtha, water, and F-T wax in fractionator 803. Note that the F-T naphtha can be channeled to a refinery reformer or steam cracker and the F-T wax can be sent to a hydrocracker, thereby further integrating biomass processing with conventional refining. Optionally, the gaseous species removed from the hydrocarbon stream by fractionator 802 can be passed through a separator 804, to remove $CO_2$, and then recycled back into unit 801 as syngas.

Still referring to FIG. 8, syngas in stream B is passed into a hybrid F-T catalytic reactor unlit 805. Similar to the fate of that of stream A, the resulting hydrocarbon stream is purified by passing it through fractionator 806 to remove gaseous species, and the purified hydrocarbon stream is then separated into gasoline, water, and diesel in fractionator 807. Also as in the case of stream A, the gaseous species can be passed through a separator 808 to remove $CO_2$, and the resulting gas recycled back into reactor unit 805 as syngas.

5. Conclusion

In summary, the present invention is directed generally to methods and systems for processing biomass into usable products—particularly where such methods and systems involve integrating such processing with conventional refineries.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed:

1. A hybrid refinery comprising:
 a) a conventional refinery operable for refining petroleum, wherein the conventional refinery comprises elements used in the conventional processing of petroleum;
 b) a subsystem for converting biomass into a feed for the conventional refinery, wherein the subsystem comprises
 i) a pyrolysis unit configured to produce pyrolysis oil from biomass comprising between 20 and 30 weight percent water;
 ii) an assembly for merging a stream of pyrolysis oil produced with the pyrolysis unit and a stream of refinery residual to form a hybrid feedstock;
 iii) a gasifier for gasifying the hybrid feedstock within the gasifier to form syngas; and
 iv) a syngas processing unit for processing the syngas to form a syngas-derived product, wherein at least some of the syngas-derived product is utilized in the conventional refinery;
 wherein said subsystem is integrated with one or more aspects of the conventional refinery and wherein the refinery is configured to at least partially replace feed steam for the gasifier with water from the biomass.

2. The hybrid refinery of claim 1, wherein the streams are combined before entering the gasifier.

3. The hybrid refinery of claim 1, wherein the streams are combined in the gasifier.

4. The hybrid refinery of claim 1, wherein the refinery residual stream comprises asphaltenes or coker coke.

5. The hybrid refinery of claim 1, wherein the gasifier is selected from the group consisting of a partial oxidation gasifier, a steam reformer, an autothermal reformer and combinations thereof.

6. The hybrid refinery of claim 1, wherein the syngas processing unit for processing the syngas comprises a method selected from the group consisting of water-gas shift, Fischer Tropsch, isosynthesis, oxygenate-generating processes, and combinations thereof.

7. The hybrid refinery of claim 1, wherein the syngas processing unit for processing the syngas involves a high-pressure process.

8. The hybrid refinery of claim 1, wherein the syngas-derived product is selected from the group consisting of $H_2$, syncrude, hydrocarbons, oxygenates.

9. The hybrid refinery of claim 1, wherein the syngas-derived product is selected from the group consisting of alcohols, ether, and combinations thereof.

10. The hybrid refinery of claim 1, wherein the syngas-derived product is selected from the group consisting of gasoline, diesel, and combinations thereof.

11. The hybrid refinery of claim 1, wherein at least some of the syngas-derived product is utilized in one or more conventional refinery processes.

12. The hybrid refinery of claim 1, wherein the syngas-derived product comprises $H_2$, and wherein the $H_2$ is used in subsequent hydroprocessing.

13. The hybrid refinery of claim 1, wherein the syngas-derived product comprises steam, and wherein the steam is used in gasification.

14. The hybrid refinery of claim 1, wherein at least some of the syngas-derived product is used for generating electrical power within the refinery.

15. The hybrid refinery of claim 1, wherein at least some of the syngas-derived product is used for generating electrical power external to the refinery.

16. The hybrid refinery of claim 1, wherein the syngas-derived product comprises an alcohol selected from the group consisting of methanol, ethanol, and combinations thereof.

17. The hybrid refinery of claim 1, wherein at least some processes of the conventional refinery and the subsystem for converting biomass are interdependent.

18. The hybrid refinery of claim 17, wherein the interdependency fosters a feedstock supply-tolerant system.

19. A system for converting biomass into a feed for a conventional refinery, wherein the system comprises:
 i) a pyrolysis unit configured to produce pyrolysis oil from biomass comprising between 20 and 30 weight percent water;
 ii) an assembly for merging a stream of pyrolysis oil produced with the pyrolysis unit and a stream of refinery residual to form a hybrid feedstock wherein the hybrid feedstock comprises from about 5 to about 90 weight percent pyrolysis oil;
 iii) a gasifier for gasifying the hybrid feedstock within the gasifier to form syngas; and
 iv) a syngas processing unit for processing the syngas to form a syngas-derived product,
 wherein at least some of the syngas-derived product is utilizable in a conventional refinery and wherein the system is configured to at least partially replace feed steam for the gasifier with water from the biomass.

20. A system for converting biomass into syngas, wherein the system comprises:
 i) a pyrolysis unit configured to produce pyrolysis oil from biomass comprising between 20 and 30 weight percent water;
 ii) an assembly for merging a stream of pyrolysis oil produced with the pyrolysis unit and a stream of refinery residual to form a hybrid feedstock wherein the hybrid feedstock consists essentially of from about 5 to about 90 weight percent pyrolysis oil and refinery residual; and
 iii) a gasifier for gasifying the hybrid feedstock within the gasifier to form syngas and wherein the system is configured to at least partially replace feed steam for the gasifier with water from the biomass.

21. The system of claim 20, wherein the system is configured to fully replace feed steam for the gasifier with water from the biomass.

* * * * *